Oct. 4, 1932.  F. H. TREGO  1,880,592

TYPE INDEXING MEANS

Filed May 31, 1930  2 Sheets-Sheet 1

INVENTOR
Frank H. Trego.
BY
John Waldheim
ATTORNEY

Oct. 4, 1932.   F. H. TREGO   1,880,592
TYPE INDEXING MEANS
Filed May 31, 1930   2 Sheets-Sheet 2
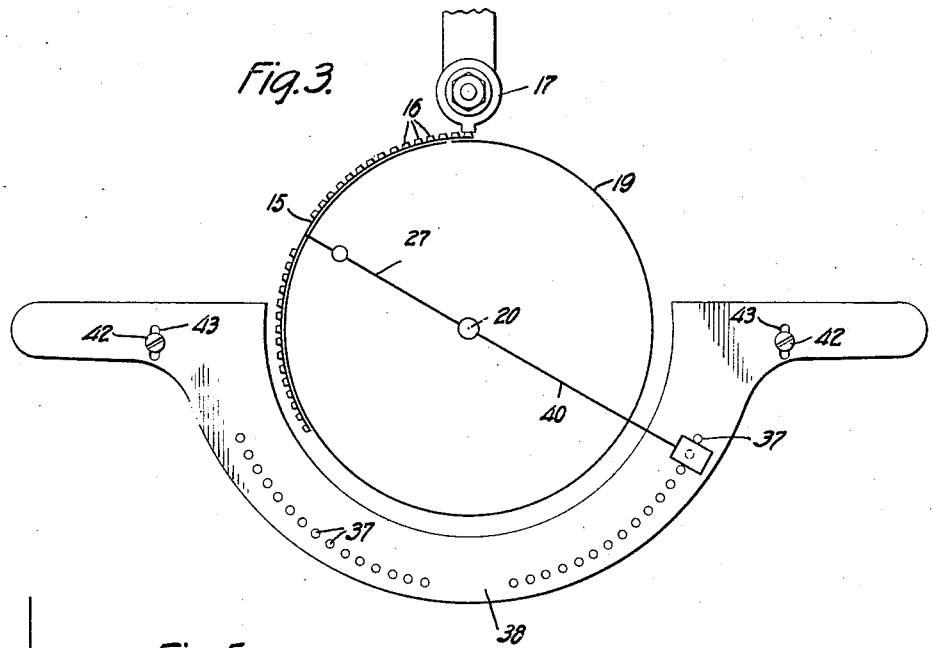
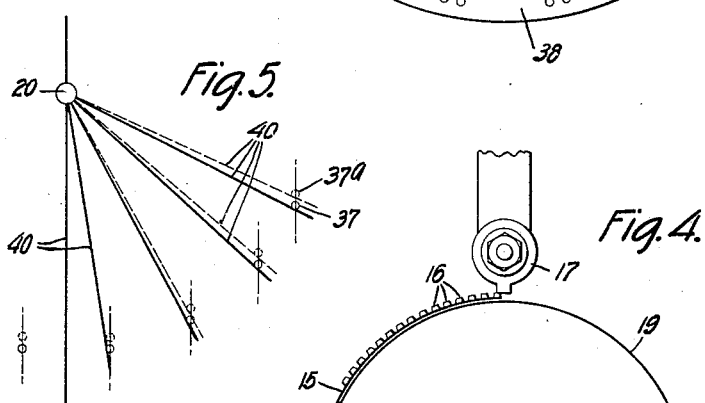
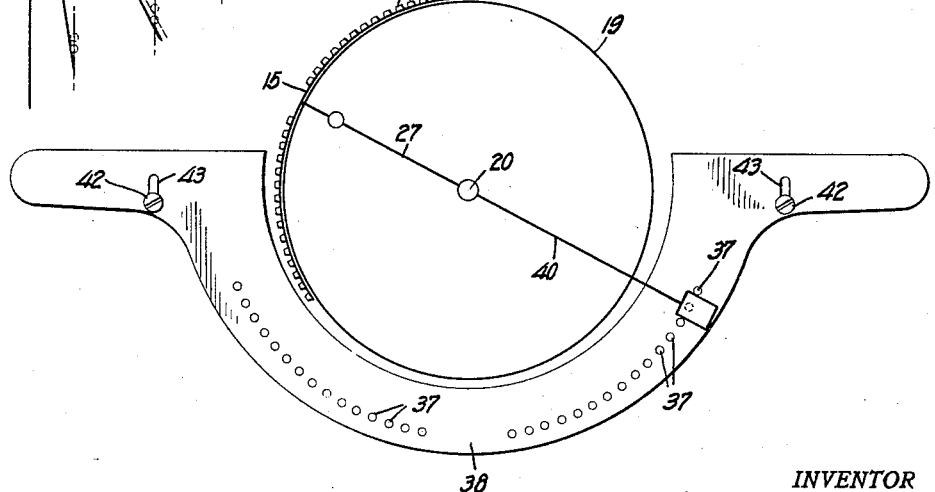
INVENTOR
Frank H. Trego.
BY
John Waldheim
ATTORNEY Patented Oct. 4, 1932

1,880,592

UNITED STATES PATENT OFFICE

FRANK H. TREGO, OF NEW YORK, N. Y., ASSIGNOR TO VARITYPER INCORPORATED, OF NEW YORK, N. Y., A CORPORATION OF DELAWARE

TYPE INDEXING MEANS

Application filed May 31, 1930. Serial No. 457,677.

This invention relates to typewriting machines and more particularly to type indexing means therefor.

In the typewriter known as the Varityper the printing instrumentalities include a type carrier or shuttle which is actuable, by any one of the key levers, about a center, through various angular distances to locate the desired type at the printing point. Said machine also includes a series of indexing devices or stops, with which a shuttle actuating lever cooperates, to assist in locating the types, as they are selected, at the printing point.

Heretofore the type shuttle has been made of rubber which, in its uncured state, is plastic and is readily pressed into a mold. It is then vulcanized to procure a finished product of hard rubber. The rubber on cooling shrinks and the shrinkage is not always the same.

Due to the fact that the contraction of rubber is not always the same the angular spacing of the types on the various type shuttles does not always correspond to the angular spacing of the indexing devices which results in improper spacing between the printed letters on the work-sheet.

An object of the present invention is to provide means whereby the inaccuracies in the angular spacing of the types, relatively to the indexing devices, may be compensated for or corrected.

In carrying out the invention, in its present form, the indexing devices are adjustable so as to vary the throw of the type shuttle actuating lever so that the angular distances through which the shuttle is moved thereby correspond to the angular distances between the types on said type shuttle.

Features and advantages will hereinafter appear.

In the accompanying drawings,

Fig. 3 is a diagrammatic top plan view illustrating the correct position of the indexing devices;

Fig. 4 is a similar view illustrating the incorrect position of the indexing devices; and Fig. 5 is another diagrammatic view illustrating the effect of shifting the indexing devices.

Similar reference characters represent similar parts throughout the several views.

Figure 1:
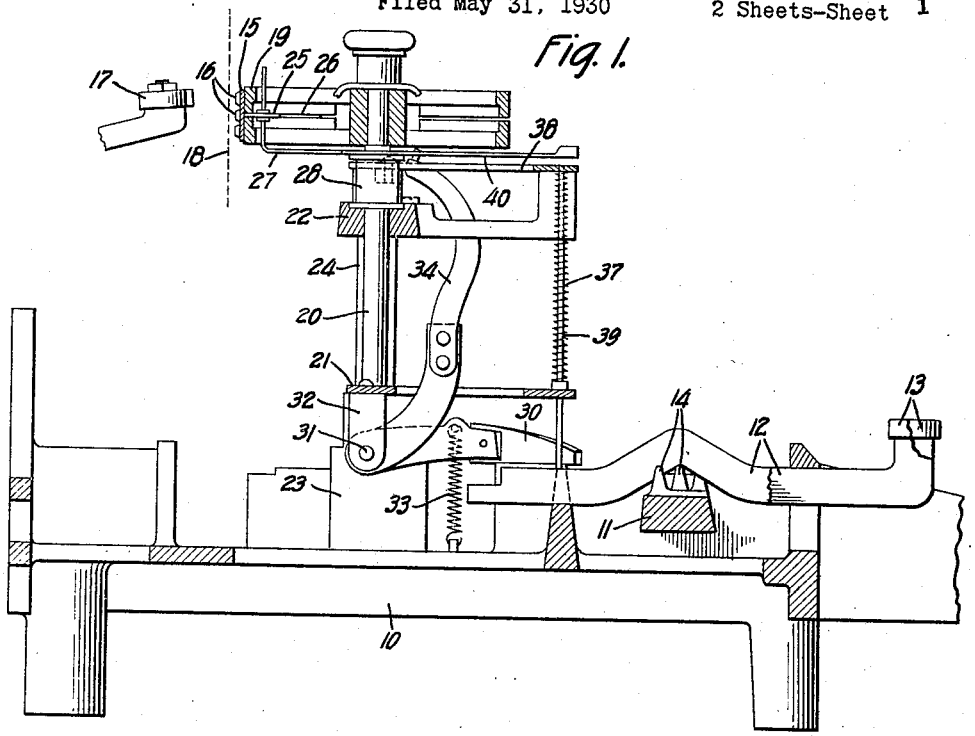
Fig. 1 is a sectional side elevation of the machine, some of the parts being omitted.

The machine includes a main frame 10 having a cross-bar 11 upon which are fulcrumed key-levers 12. Upon the depression of any one of the character keys 13 the corresponding key-lever 12 is swung about its fulcrum 14 to actuate a type shuttle 15, in a manner hereinafter described, to carry the selected one of the types 16 to the printing point.

After the selected type reaches the printing point a hammer 17 is operated to co-operate with said type to print the selected character on a work-sheet 18.

The type shuttle or segment 15 is supported on an anvil 19 supported on a vertical rod 20 suitably supported in a lower plate 21 and an upper plate or bar 22; the lower plate 21 being supported on posts 23 of the machine frame 10, the upper plate 22 being supported on posts 24 secured to the plate 21.

Figure 2:
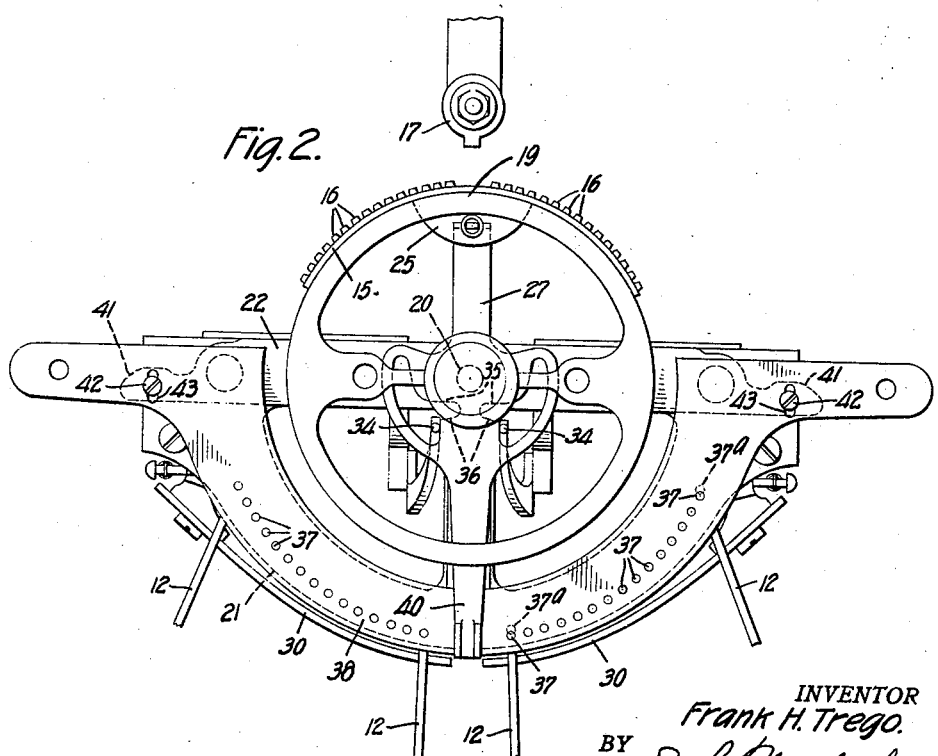
Fig. 2 is a top plan view of some of the parts shown in Fig. 2.

The face of the anvil 19 is concentric with the axis of the shaft 20 and the type shuttle conforms to the shape of said anvil. Said type shuttle is provided with a fin or web 25 extending through a slot 26 on said anvil. A lever 27 is pivotally mounted by a sleeve 28 on the rod 20, the sleeve 28 bearing on the bar 22. The lever 27 is connected to the fin 25 so that the type shuttle 15 may be operated in either direction (Fig. 2) from a normal position.

To actuate the shuttle operating lever in either direction the key-levers are divided into two groups, in the usual manner, one group at each side of the middle of the machine. Each group has associated therewith a universal bar 30 actuable by the key-levers about the axis of a shaft 31 on a fixed bracket 32, and against the action of a return spring 33. Each universal bar 30 has associated therewith an upwardly extending arm 34, the upper end of which is moved rearwardly in Fig. 1 when the universal bar 30 is actuated by any one of the key-levers 12.

The upper ends of the arms 34 are adapted to swing in vertical planes at opposite sides of the rod or shaft 20 and each, when operated, engages a shoulder 35 of the actuating lever 27 to swing it about the axis of the shaft 20 and thus operate the type shuttle to carry the selected type to the printing point. To return the type shuttle to normal the lever 27 is provided with another shoulder 36 with which the operated arm 34 engages to return said lever and the connected type shuttle to normal.

Indexing devices or stops 37 are provided to assist in locating the selected type at the printing point. These are arranged in an arc about the shaft 20 and are guided in the plate 21 and an arcuate plate 38, one of said indexing devices being disposed above each key-lever 12. Upon the actuation of any key-lever the associated indexing device or pin 37 is moved upwardly thereby against the action of a return spring 39 to project the upper end into the path of an arm 40 of the shuttle actuating lever 27; said arm striking the set indexing device to register the selected type at the printing point.

The arcuate plate 38 which guides the upper ends of the indexing pins 37 is secured to lugs 41 on the ends of the bar 22 by screws 42 extending through slots 43 in the guide 38 and threaded into the lugs 41. It will be understood that this manner of attaching the guide plate 38 enables or affords an adjustment of said plate fore-and-aft of the machine to accordingly change the position of the upper ends of the indexing devices, or, in other words, shifting them horizontally in vertical planes (Fig. 5) extending parallel to the normal position of the lever 27, so that the angular motion of said lever may be decreased or increased to procure the movement of the type shuttle necessary to accurately register the types at the printing point and thus compensate for the variation in the angular distances between the types of the type shuttles 15.

It will be understood that the variation of the spacing of the types near the middle of the shuttle is not perceptible and accordingly any shifting of the position of the indexing pins near the middle of the machine has practically no effect on the degree of movement of the type shuttle. It will also be understood that this variation in the spacing accumulates and consequently the angular distance from the middle of the type shuttle to the outermost type is quite perceptible. Accordingly the adjustment of the indexing pins as described above permits an increasingly greater variation in the angular movement of the type shuttle for the types as they progress from the middle towards the ends of the shuttle; the displacement of the indexing pin, however, being the same.

It will further be understood that this variation diminishes gradually from the outer indexing pin to the inner one.

From the foregoing it will be understood that there is effected a relative adjustment between the guide plate 38 and the fulcrum of the actuating lever 27 and that this adjustment is accomplished preferably by setting the guide plate 38 with the indexing devices or stops 37 relatively to the center or fulcrum of the shuttle actuating lever 27. It will also be understood that said indexing devices or stops are adjustable in vertical planes parallel to the normal position of said shuttle actuating lever.

Having thus described the invention it will be understood that alterations and changes may be made without departing from the spirit of the invention as defined in the appended claims.

I claim:—

1. In a typewriting machine, the combination of a type sector, an actuating lever for said sector, a pivot for said lever, key-levers, means operable by the key-levers to operate the actuating lever, indexing devices arranged in an arc about said pivot, said indexing devices being associated one with each key lever and being settable thereby into the path of the actuating lever so that the latter is arrested by the indexing devices to accurately position the type sector with the selected type at the printing point, and means to effect an adjustment between the pivot of said actuating lever and the indexing devices to compensate for variations in spacing of the types on various type sectors which may be used in the machine.

2. In a typewriting machine, the combination of printing means including a rotatable type carrier, key operated means to actuate said type carrier and locate the selected type at the printing point, and adjustable means to vary the angular movements of the type carrier to the printing point to compensate for variation in the spacing between the types of various segments.

3. In a typewriting machine, the combination of printing instrumentalities including a rotatable type segment, key-levers, means including a lever operable by any one of the key-levers to actuate the type sector through angular distances depending on the key-lever operated, arresting devices engageable by the actuating lever to register the type corresponding to the actuated key lever at the printing point, and means to vary the positions of the arresting devices to vary the angular movements of the type segment.

4. In a typewriting machine, the combination of key-levers, printing means including a segment having types thereon corresponding to the various key-levers, means operable by the key-levers to operate the type segment, said means including a pivoted actuating lever connected with said segment, indexing devices operable by said key levers, said indexing devices being arranged in an arc about the pivot of said actuating lever, said actuating lever co-operating with the actuated indexing device to arrest the type segment with the type corresponding to the actuated key-lever at the printing point, and means to adjust the indexing devices to procure the angular movements of the actuating lever necessary to accurately position the types of the segment at the printing point.

5. In a typewriting machine, the combination of key-levers, printing means including a segment having types thereon corresponding with the various key-levers, means operable by the key-levers to operate the type segment, said means including a pivoted actuating lever connected with said segment, indexing devices operable by said key levers, a guide plate for said indexing devices, said indexing devices being arranged in an arc about the pivot of said actuating lever, said actuating lever co-operating with the actuated indexing device to arrest the type segment with the type corresponding to the actuated key-lever at the printing point, and means to permit an adjustment of said guide plate to thereby position the indexing device so that the latter when operated will accurately position the type shuttle through the medium of said actuating lever.

6. In a typewriting machine, the combination of printing means including a segmental type carrier, types on said carrier spaced angular distances from each other, key-levers, means operable by the key-levers to actuate the type carrier through various angular distances corresponding to the spacing of the types, a stop member associated with the type carrier, indexing devices operable by the key-levers and to be engaged by the stop to arrest the type carrier, a guide plate for said indexing devices, and means to permit an adjustment of said guide plate to effect an adjustment of the indexing devices to vary their positions to correspond with the angular distances through which the type carrier is moved to carry the various types to the printing point.

7. In a typewriting machine, the combination of a type segment, two sets of types thereon, the type sets being disposed at opposite sides of a printing point, key-levers, an actuating lever connected to said segment, means operable by said key-levers to operate the actuating lever in opposite directions to position any one of the types of either set at the printing point, two sets of indexing devices arranged one set at each side of a normal or central position of the actuating lever, said indexing devices being arranged in an arc, and means to adjust the indexing devices horizontally in vertical planes extending parallel to the position normally occupied by the actuating lever.

8. In a typewriting machine, the combination of a type segment, means including a lever to swing said segment in an arc about a center, stops, one for each type, said stops to be engaged by said lever to arrest the type segment with the corresponding type at the printing point, said stops being arranged in an arc about said center, and means to effect a relative shift between said lever and said stops in vertical planes parallel to the normal position of said lever to thus vary the angular movements of said lever determined by said stops.

9. In a typewriting machine, the combination of printing means including a rotatable type carrier, key operated means to actuate said type carrier and locate the selected type at the printing point, adjustable means to vary the angular movements of the type carrier to the printing point to compensate for variation in the spacing between the types of various segments, an element to control the adjustable means, and means to secure said element to hold the adjustable means in adjusted position.

10. In a typewriting machine, the combination of printing instrumentalities including a rotatable type segment operable about its axis, indexing devices, a guide plate for said indexing devices, a stop lever associated with the type segment and to co-operate with the indexing devices, the guide plate being adjustably mounted so that the indexing devices may be adjusted thereby to vary the movement of the stop lever determined by each indexing device and accordingly vary the angular distances through which the type segment is moved, and devices to secure the plate in its adjusted position.

11. Printing instrumentalities for a typewriting machine including a type segment rotatable through various angular distances, a stop associated with said segment and operating therewith, selectable indexing devices with which the stop may co-operate, and means to vary the positions of the indexing devices to vary the angular movements of the type segment.

12. Printing instrumentalities for a typewriting machine including a type segment rotatable through various angular distances, arresting means for the type segment, and means to adjust the arresting means so that the angular movements of the type segment may be varied.

13. Printing instrumentalities for a typewriting machine including a type segment rotatable through various angular distances, arresting means for the type segment including individually operable devices, and a co-operating device associated with the type segment, and means whereby said operable devices may be adjusted simultaneously relatively to the co-operating device to vary the angular movements of the type segment.

14. In a typewriting machine, the combination of a type segment to be actuated in an arcuate path, a stop associated with said segment, indexing devices to be engaged individually by said stop to arrest the corresponding types at the printing point, and means whereby a relative adjustment may be effected between the type shuttle and the indexing devices to vary the angular movements of the type shuttle, the arrangement of the indexing devices and the stop being such that the relative adjustment permits a greater variation in angular movement of the shuttle at the indexing devices farther removed from the normal position of the stop than the variation permitted by the indexing devices closer to normal position of the stop.

15. In a typewriting machine, the combination of a type segment actuable in a curved path, an actuating lever therefor, key controlled indexing devices arranged in a row extending laterally from the actuating lever in its normal position, said indexing devices to be engaged by said lever to arrest the type segment in various actuated positions, according to the selected type, and means whereby the indexing devices may be adjusted simultaneously and the same extent relatively to the pivot of the actuating lever, the arrangement of indexing devices being such that the adjustment thereof permits a greater variation in the angular movement of the type shuttle at a remote indexing pin than the variation permitted by an indexing pin nearer the normal position of the actuating lever.

In witness whereof I have hereunto affixed my signature.

FRANK H. TREGO.